Feb. 12, 1952 J. BANDURA ET AL 2,585,076
BOX BLANK HANDLING MACHINE
Filed Feb. 14, 1948 5 Sheets-Sheet 1

Inventors
JAMES BANDURA
RAYMOND J. BAISLEY
JOSEPH PFEFFER
CLIFFORD D. KEELY

By
Attorneys

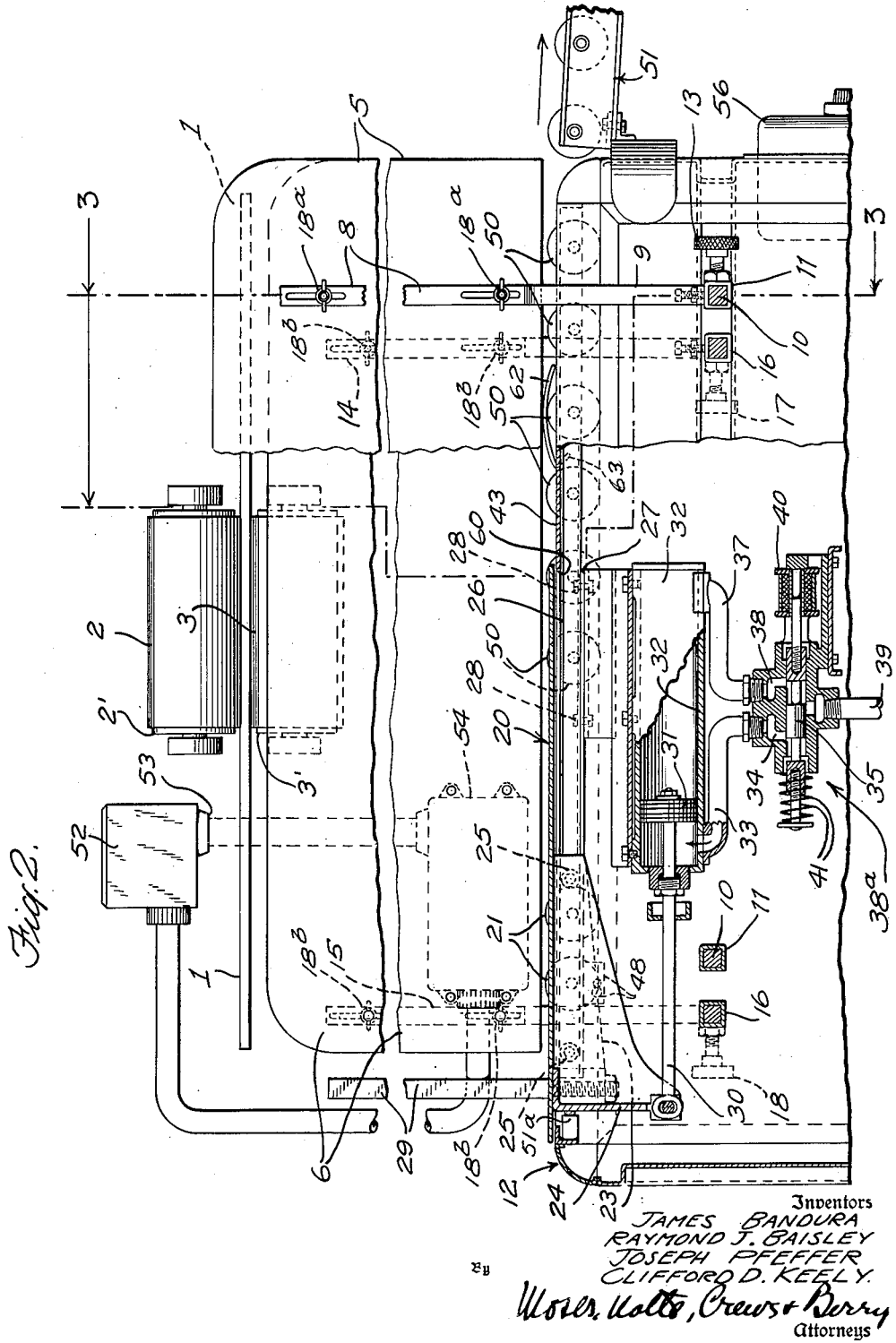

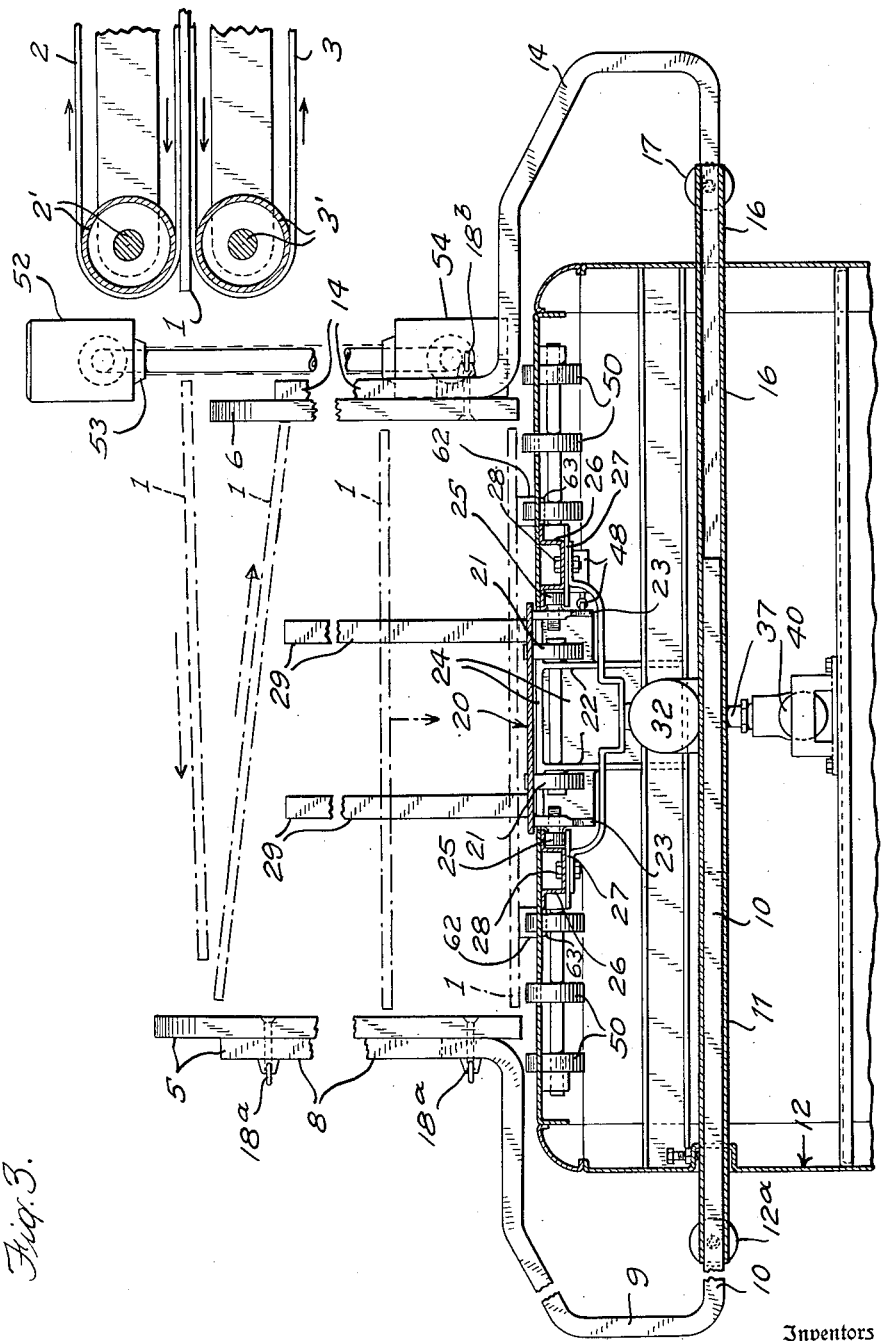

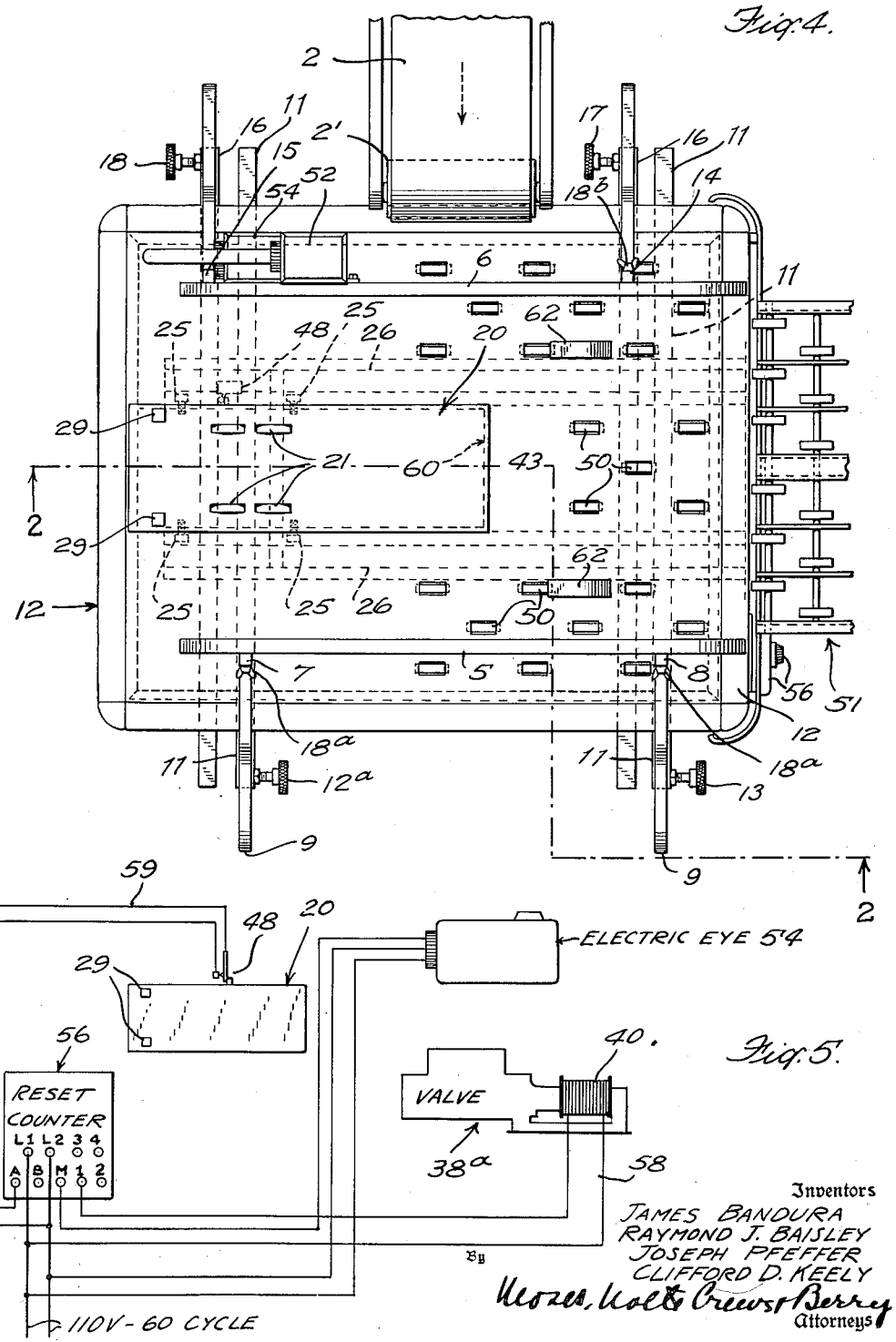

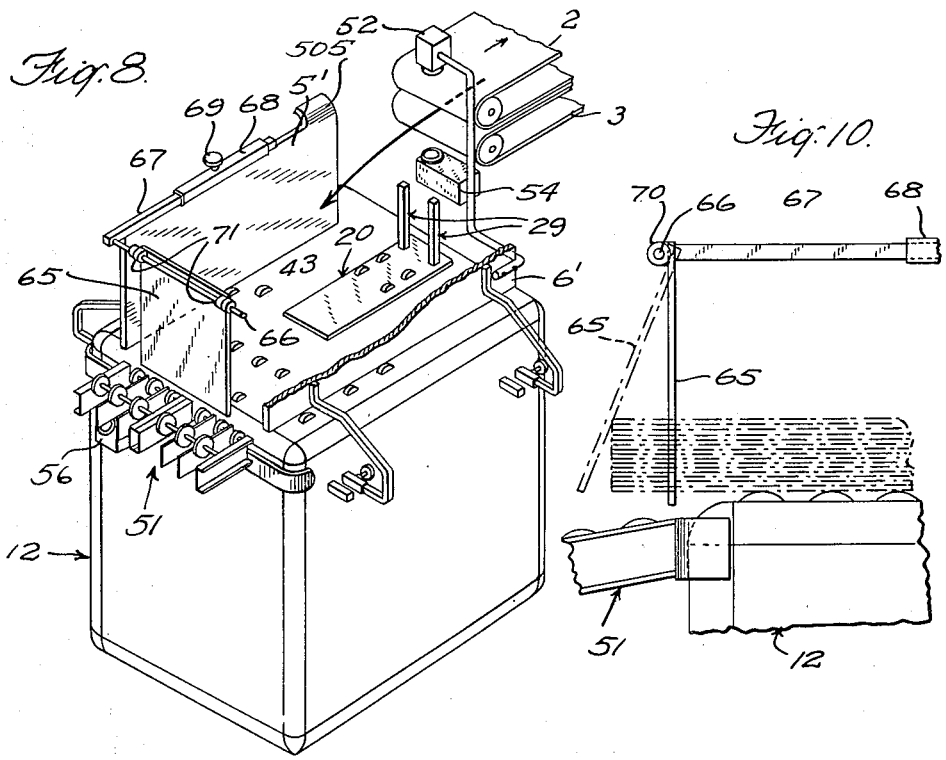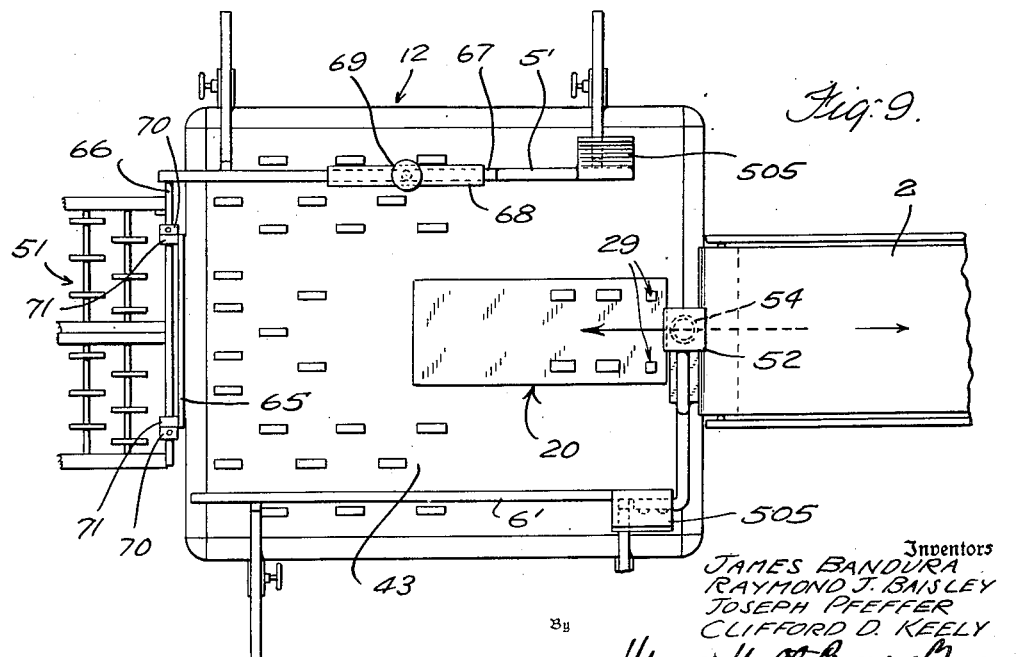

Patented Feb. 12, 1952

2,585,076

UNITED STATES PATENT OFFICE 2,585,076

BOX BLANK HANDLING MACHINE

James Bandura, Astoria, Raymond J. Baisley, Hempstead, and Joseph Pfeffer, New York, N. Y., and Clifford D. Keely, West Englewood, N. J., assignors to General Corrugated Machine Company Inc., Palisades Park, N. J., a corporation of New Jersey Application February 14, 1948, Serial No. 8,476

1 Claim. (Cl. 214—6)

Our present invention relates to a machine for handling blanks, particularly those having a substantial degree of stiffness, as for example collapsed boxes of corrugated board or flat sheets. More specifically it has to do with a machine for decounting such blanks, stacking them and when a pre-determined number has been stacked, ejecting the stack and delivering it to a conveyor which transports it to another station where operations may be performed upon it, as for example tying or wrapping it.

In general the object of our invention is to devise such a machine which will perform the stated operations in rapid and efficient manner. A more specific object is to provide means insuring that the stack of blanks formed will have its vertical edges in substantial alignment; a still further object is to provide for automatic means for ejecting the stack when a pre-determined number of blanks has been received and counted and to re-set the counter whereby the formation of a new stack may be begun without attention to the machine on the part of the operator.

Further objects of our invention will be apparent as the description proceeds and the novel features will be pointed out in the appended claim.

Our invention will be best understood by reference to the following detailed description taken with the annexed drawings, in which:

Fig. 2 is a view of the left side of the device as seen in Fig. 1 with parts broken away and in section.

Fig. 3 is an end view—the lefthand end as seen in Fig. 1 with parts in vertical section.

Fig. 4 is a plan view with the observer facing the lefthand side of the device as seen in Fig. 1.

Fig. 5 is a diagram of the electrical circuits used.

Figs. 8, 9 and 10 show a modification in which the stack of blanks is fed from the table in the same direction as the individual blanks are fed thereto.

Figures 1, 6, 7:
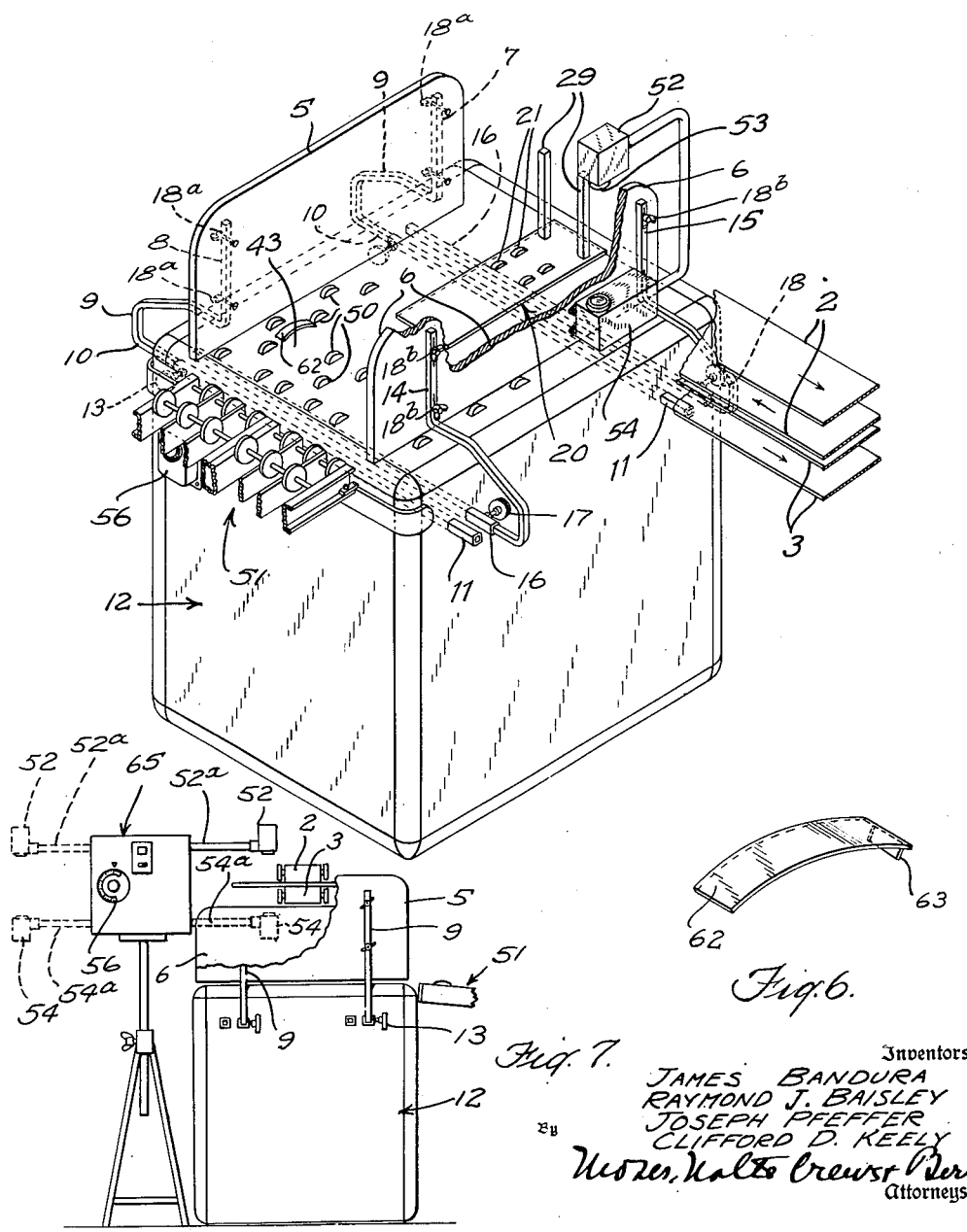
Figure 1 is a view in isometric projection of a preferred embodiment.
Fig. 6 shows a spring clip for supporting the blanks on the receiving table.
Fig. 7 shows separate mounting for the photoelectric cell, light source and counter.

In general we achieve the foregoing objects by receiving continuously fed blanks from a delivery device which is caused to throw each blank against a target stop gage of our machine from which the blank is caused to rebound and strike an oppositely disposed or rebound target or squaring gage and in this manner to be piled upon a carriage with the leading edges in substantial alignment, the positions of the two targets being capable of suitable adjustment for different sizes of blanks. In passing from the delivery mechanism to the first target the blanks are caused to actuate a counting device as by intercepting a light beam directed on a photoelectric cell. Then after a predetermined number of actuations of the counting device a throw mechanism is operated to eject a stack and cause it to reach a conveyor which takes it to the next station. Further mechanism is provided to actuate the resetting of the counting mechanism and to retract the stack-supporting carriage to where it will be in a position to receive the next blank.

Referring now to the drawings and to Figures 1 and 3 in particular, the blank 1 as seen in Fig. 3 is conveyed to the stacking device by any suitable mechanism which per se is not a part of our present invention. In the embodiment shown it consists of a pair of superimposed belt conveyors 2, 3 which respectively pass around pulleys 2', 3', and between them engage the blank. Normally the latter is engaged with its long dimension crosswise. The operation of the superimposed conveyors 2, 3 is to throw the leading edge of the blank against receiving target 5 from which it rebounds and strikes an opposite or rebound target 6, the top of which is somewhat below the top of target 5 as clearly seen in Figure 3. Both targets are adjustably supported; thus target 5 is supported by a pair of bar brackets 7, 8 each of which has a horizontally disposed U bend 9 therein, the lower stretch 10 of the bend being contained in a square tube 11 disposed in the frame 12 of the device. Such bracket member 10 is slideable in the tube 11 and is held in adjusted position by set screw 12a, Figure 4, a similar screw 13 being provided for the bar member 8. Similarly, rebound target 6 is held by bar members 14, 15 of similar shape, each of which is held in a tube 16 by means of a set screw 17, a similar screw 18 being had for bar member 15 in Figure 4. By virtue of the U-shaped brackets supporting the targets 5 and 6, the same may be moved a distance apart substantially less than the table width.

The target stop gage 5 is adjustable vertically (wing nuts 18a) Fig. 2 to always contact the table top to prevent the first blank catching under it and the table top and to permit lowering this gage to the cross bars when opened out beyond the table top in accommodating larger sizes to prevent the first blank from creeping underneath when landing.

In operation a protective pad such as a sheet of corrugated board may preferably be held against the target surface by means of attachment to cushion the shock of stopping each blank.

The so delivered blanks fall upon plate 20, Figure 4, one element of a carriage to be further described, which carries so as to project therethrough, anti-friction rollers 21, see also Figures 2 and 3. Reference to Figure 3 shows that rollers 21 are journaled on studs which project from cast aluminum member 23 having depending sides 22. Plate 20 itself is carried upon top side of cast member 23, Figures 2 and 3, and upon a transverse depending piece 24, Figure 2, which is also an integral part of said casting. In order to permit the plate 20 and cast member 23 to slide, the latter is provided on each side thereof with rollers 25 journaled in the side member 23 and engaging in a race formed by a flanged U bar 26 and a lower plate 27 secured thereto as by means of bolts 28. Elements 20 to 23 thus constitute a sort of carriage which for convenience will be referred to as carriage 20. Also constituting a part of the carriage 20 are pusher pins 29 carried by elements 23 and 24 as shown in Figure 2. The means for moving the carriage 20 to eject the stack therefrom will now be described.

Reference to Figure 2 shows a rod 30 flexibly attached to the rear piece 24 of the carriage 20 at one end and at the other to a piston 31 in a cylinder 32 suitably disposed in the frame 12 of the machine. Piston 31 is actuated by compressed air admitted through pipe 33 to the left side of the piston 31 when the port 34 of the air valve shown is uncovered by the cylindrical slide valve 35, or to the other side through pipe 37 when port 38 is uncovered by valve 35, the air being admitted to valve assembly (designated by 38a) through pipe 39. As shown the valve 35 is slideable to the right by means of solenoid 40 against the tension of spring 41. As shown the port 34 which admits air to the lefthand side of the piston is normally closed. When, however, the solenoid 40 is actuated, the valve 35 moves sufficiently far to the right to admit air through pipe 33 to move the piston rapidly to the right thereby ejecting the stack of blanks from off the carriage 20 and table 43 to conveyor member 51.

The circuit which is made by the actuation of the solenoid 40 includes a limit switch 48, Figures 5 and 3, this switch, however, being actuated to open the circuit when the carriage 20 moves out of contact therewith. The circuit being thus broken allows the valve 35 to be retracted by the action of the spring 41 (if desired a second solenoid may be used instead of spring 41, such second solenoid being actuated by the breaking of the circuit through the limit switch 48 above mentioned), and this action admits air to the righthand side of the piston to pipe 37 and causes the piston and the carriage 20 to be moved back to its former position to receive further blanks. A stop 51a of resilient material cushions the impact of the return stroke of carriage 20. A similar stop not shown may be provided to cushion the forward stroke of the carriage.

It will be noted that the limit switch 48 is not opened until the carriage has travelled a substantial part of the forward stroke (see Figure 5 for example); during this time the air is pushing the piston to the right, Figure 2. When, however, the switch 48 is opened the carriage 20 has done the essential work of imparting sufficient momentum to the stack of blanks so as to enable them to reach the conveyor 51. Having started to move on table 43 the moving stack is supported by anti-friction rollers 50, Figure 4, which project through the table as seen in Figures 1 and 2. The stack thereby is caused to slide on the rollers 50 on to the conveyor 51 of known type, which is slanted downwardly so as to insure travel of the stack thereon by the action of gravity.

*Counting mechanism.*—Reference to Figure 2 shows a housing 52 containing a light source not shown which projects a beam of light through an opening 53 containing a suitable optical condensing system not shown. The beam of light thus issuing from the opening normally is projected upon a photoelectric cell 54 which, as shown in Figure 5, is electrically connected to a counter 56 of known type. Reference to Figures 1, 2 and 3 shows that the light beam from the opening 53 is intercepted each time a blank is delivered to the stacking mechanism whereby the counter 56 is actuated. Counter 56 is of the type which makes a circuit when a predetermined number of actuations has been received, the device being set ahead of time for the particular number of blanks to constitute the stack. When the predetermined number has been reached the counter makes a circuit 58 through the solenoid 40 and the limit switch 48. Before the end of the throw of the carriage 20 the limit switch 48 is opened which not only breaks the circuit 58 but also actuates a circuit 59 to re-set the counter. The carriage 20 having been restored to its initial position the circuit 58 is made through the counter, subject to the actuation thereof upon the completion of the count, thereby to commence the cycle.

It will thus be seen that upon actuation, the carriage 20 is thrown rapidly to the right but is thereafter stopped by the admission of air to the righthand side of the piston 31 and is thereupon retracted to its initial position while closing the limit switch 48. Because of the fact that the bulk of the weight of the blanks is supported on rollers 21 and because of the momentum imparted to the stack of blanks, the latter readily leave the carriage 20 when this starts to return to its initial position. Normally the action of the carriage is sufficiently rapid so that a complete to and fro movement is had in time to receive the next blank from the conveyors, 2, 3. By adjusting the position of the target 5 and rebound target 6 the sides of the blanks are accurately aligned while alignment at right angles to these dimensions is readily had by the action of the pusher or kicker pins 29.

Reference to Figure 4 will show that table 43 necessarily has a cut out portion indicated by dotted line rectangle 60 to accommodate the supporting structure for the carriage 20. If desired the lamp 52, the photo-electric cell 54 and the counter 56 may be mounted on a floor stand separate from the machine whereby to avoid the shock occasioned by the to and fro movement of the carriage 20.

In the operation of the machine it is sometimes found that the rollers 50 may be left still spinning when the first blank of a new set arrives on the machine. The effect of the spinning rollers will be to displace the blank slightly from its proper position on the table 43. To counteract this, two or more spring clips 62 are provided, having a restricted end portion or tongue 63 which fits in the opening of a wheel 50. The springiness in the clips is so chosen that the first blank upon arrival is held away from the spinning wheels but when a stack has been built up the clips are no longer able to maintain the formed stack out of contact with the table 43 and hence the rollers 50, so that the clips offer no resistance to the ejection of the stack.

In the use of the machine it is desirable to mount it so that the target 5 is at a very slight angle to the leading edge of the oncoming blank whereby the blank first strikes the target with a corner thereof rather than with the entire edge. By so disposing the machine with reference to the conveyor 2 the alignment of the individual blanks is facilitated.

In Fig. 7 the light source 52, the photo-electric cell 54 and counter 56 are mounted from the floor separately and independently of the device itself whereby any vibration undergone by the device itself is not transmitted to said source and cell. Thereby the life of these elements is prolonged. It will also be noted that the arms holding the source 52 and cell 54 may occupy the positions shown in dotted lines, thus enabling these elements to be mounted on the opposite side of the frame 12 while keeping the counter 56 facing the same way.

Desirably the device will be supported on casters not shown when the device is to be moved toward and away from the folding machine. As is customary the casters are retracted when the device is in use allowing it to rest firmly on the floor.

Referring to Figures 8 to 10 it will be seen that the device as shown permits stacked blanks to leave the table in the same direction as the individual blanks are fed thereto. Vane 5', similar in shape and in adjustment to target 5 of the embodiment previously described acts as a guide for the side edges of the blanks and causes the stack to build up with its sides substantially vertical. Similarly, adjustable vane or guide 6' likewise helps to maintain the formed stack in vertical alignment. Preferably each vane 5', 6' is provided with a flared portion, one of which 505 is seen in Figs. 8 and 9 whereby to facilitate the centering of the blanks upon their arrival on the table. As the target against which the leading edges of the blanks strike we have provided vane 65 which is pivoted at the top thereof on a horizontally disposed shaft 66, such shaft being held in an arm 67 secured on top of element 5 by means of a sleeve 68 attached to element 5 by means not shown. The arm 67 is adjustably held in the sleeve 68 by means of a set screw 69.

Target 65 likewise is adjustably held on the shaft 66 by bushings 70—70 secured to the shaft 66 by set screws. Finally target proper 65 is secured to bearings 71—71 which turn on the shaft 66.

When the box blank is fed from between the conveyors 2, 3 it strikes against target 65 but at such a height above the table 43 as to affect the position of the target 65 but slightly, the blank rebounding from the target 65 against the pusher elements 29. When, however, a stack has been built up as shown in Fig. 10 and is pushed forward by action of the pushers 29 it swings the target 65 upwardly so as to clear the moving stack.

We claim:

In a box blank receiving, stacking and delivering device, a stable for receiving the blanks flatwise and having anti-friction blank supporting elements therein, a first target against which the leading edge of each of said blanks impinges, a rebound target opposite said first target and a vertically extending pusher device on said carriage and between said targets and means to move same to eject the stacked blanks, said targets and said pusher device acting upon the pile of received blanks to cause them to form a stack with the edges of the stack in approximate vertical alignment, anti-friction rollers supporting the formed stack and a spring clip device raising the first received blank above said rollers but being responsive to the weight of a plurality of said blanks to permit the formed stack to be supported by said rollers.

JAMES BANDURA.
RAYMOND J. BAISLEY.
JOSEPH PFEFFER.
CLIFFORD D. KEELY.

REFERENCES CITED

The following references are of record in the file of this patent:

UNITED STATES PATENTS

| Number | Name | Date |
|---|---|---|
| 717,885 | Mercader | Jan. 6, 1903 |
| 1,569,032 | Reichel | Jan. 12, 1926 |
| 2,026,284 | Metternich | Dec. 31, 1935 |
| 2,256,327 | Parkes et al. | Sept. 16, 1941 |
| 2,414,059 | Powers | Jan. 7, 1947 |
| 2,424,093 | Harred | Jan. 15, 1947 |